(12) United States Patent
Wu et al.

(10) Patent No.: US 12,632,242 B2
(45) Date of Patent: May 19, 2026

(54) CONFIGURATION OF AUTOMATED GUIDED VEHICLES

(71) Applicant: ABB SCHWEIZ AG, Baden (CH)

(72) Inventors: Dong Wu, Shanghai (CN); Yaodong Ni, Shanghai (CN); Xuan Cao, Shanghai (CN)

(73) Assignee: ABB Schweiz AG, Baden (CH)

( * ) Notice: Subject to any disclaimer, the term of this patent is extended or adjusted under 35 U.S.C. 154(b) by 168 days.

(21) Appl. No.: 18/580,299

(22) PCT Filed: Sep. 15, 2021

(86) PCT No.: PCT/CN2021/118588
§ 371 (c)(1),
(2) Date: Jan. 18, 2024

(87) PCT Pub. No.: WO2023/039763
PCT Pub. Date: Mar. 23, 2023

(65) Prior Publication Data
US 2024/0311128 A1     Sep. 19, 2024

(51) Int. Cl.
*G06F 8/65*          (2018.01)
(52) U.S. Cl.
CPC ..................................... *G06F 8/65* (2013.01)
(58) Field of Classification Search
CPC ....................................................... G06F 8/65
See application file for complete search history.

(56) References Cited

U.S. PATENT DOCUMENTS

| | | | | |
|---|---|---|---|---|
| 9,260,244 | B1 * | 2/2016 | Cohn | G06F 3/0482 |
| 9,604,541 | B1 * | 3/2017 | Anter | B60R 16/037 |
| 9,948,512 | B2 * | 4/2018 | Cabral | H04W 28/021 |
| 2012/0041638 | A1 * | 2/2012 | Johnson | G06F 11/3003 |
| | | | | 701/33.1 |
| 2015/0113521 | A1 * | 4/2015 | Suzuki | G06F 8/65 |
| | | | | 717/173 |

(Continued)

FOREIGN PATENT DOCUMENTS

| | | |
|---|---|---|
| CN | 107705045 A | 2/2018 |
| CN | 106569498 B | 5/2019 |

(Continued)

OTHER PUBLICATIONS

Anonymous: "How to implement an AGV", Nov. 15, 2018, 7 pp.

(Continued)

*Primary Examiner* — Douglas M Slachta
(74) *Attorney, Agent, or Firm* — Greenberg Traurig, LLP

(57)          ABSTRACT

Methods, apparatuses, systems, and computer readable media for configuring a plurality of automated guided vehicles (AGVs). In a method, a plurality of folders corresponding to the plurality of AGVs are created at a management system managing the plurality of AGVs. A folder includes at least one configuration file for configuring an AGV. Based on a configuration file in the folder, a further folder of the plurality of folders is updated. One or more configuration files in the updated further folder are transmitted to an AGV corresponding to the further folder. Further, embodiments of present disclosure provide apparatuses, systems, and computer readable media for managing a plurality of AGVs.

12 Claims, 6 Drawing Sheets

200

(56) References Cited

U.S. PATENT DOCUMENTS

| | | | | |
|---|---|---|---|---|
| 2015/0193219 A1* | 7/2015 | Pandya | .................. | H04L 67/34 |
| | | | | 717/171 |
| 2015/0277942 A1* | 10/2015 | Rork | .................. | G06F 9/44505 |
| | | | | 701/31.4 |
| 2016/0283256 A1* | 9/2016 | Standley | ............. | G06F 9/44505 |
| 2017/0126810 A1* | 5/2017 | Kentley | ................ | G06Q 10/00 |
| 2017/0242680 A1* | 8/2017 | Angus | ....................... | G06F 8/65 |
| 2018/0321929 A1* | 11/2018 | Persson | ................ | H04L 63/123 |
| 2019/0391800 A1* | 12/2019 | Lin | ........................... | G06F 8/65 |
| 2020/0117581 A1* | 4/2020 | Rajapakse | ........... | G06F 11/3688 |
| 2020/0213287 A1* | 7/2020 | Zhang | .................. | H04L 63/123 |
| 2021/0191707 A1* | 6/2021 | Ullman | ................. | B60K 35/20 |

FOREIGN PATENT DOCUMENTS

| | | | |
|---|---|---|---|
| CN | 111752241 A | 10/2020 | |
| CN | 112286151 A | 1/2021 | |
| CN | 112596918 A | 4/2021 | |
| CN | 112804644 A | 5/2021 | |
| WO | 03081392 A2 | 10/2003 | |

OTHER PUBLICATIONS

Anonymous: "Robot simulation using OLP command in process simulate", Jun. 5, 2019, pp. 1-20.
Siemens Software: "Image for Process Simulate Virtual Commissioning Robotic Systems Kinematic Validation", Aug. 10, 2021, 2 pp.
Anonymous: "Video: AGV Simulation—Achieve a flexible and dynamic environment with Process Stimulate", Feb. 20, 2020, 2 pp.

* cited by examiner

100

200

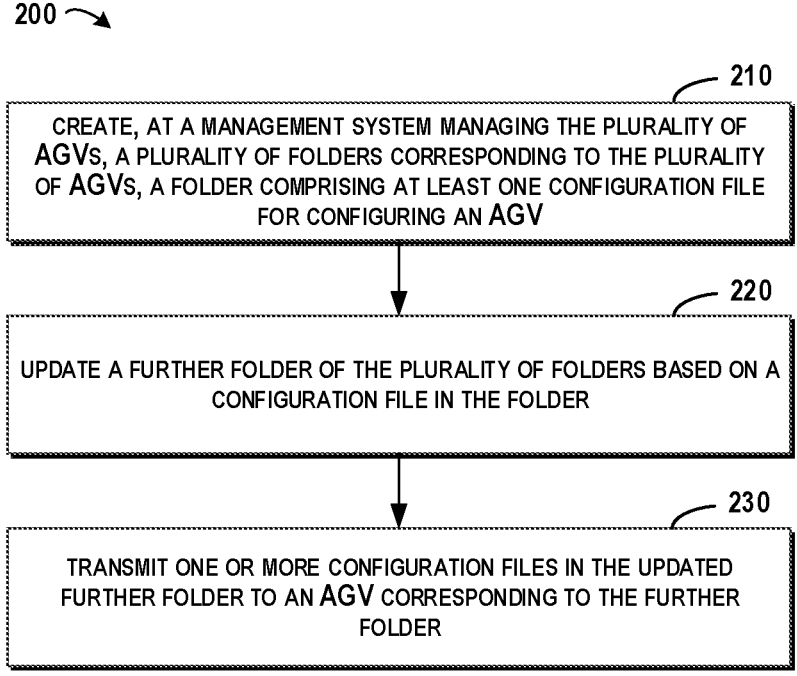

210

CREATE, AT A MANAGEMENT SYSTEM MANAGING THE PLURALITY OF AGVS, A PLURALITY OF FOLDERS CORRESPONDING TO THE PLURALITY OF AGVS, A FOLDER COMPRISING AT LEAST ONE CONFIGURATION FILE FOR CONFIGURING AN AGV

220

UPDATE A FURTHER FOLDER OF THE PLURALITY OF FOLDERS BASED ON A CONFIGURATION FILE IN THE FOLDER

230

TRANSMIT ONE OR MORE CONFIGURATION FILES IN THE UPDATED FURTHER FOLDER TO AN AGV CORRESPONDING TO THE FURTHER FOLDER

PROCESSOR

720

MEMORY UNIT

722

INSTRUCTIONS

CONFIGURATION OF AUTOMATED GUIDED VEHICLES

CROSS-REFERENCE TO RELATED APPLICATIONS

This is a national stage application claiming priority to international patent application Serial No.: PCT/CN2021/118588, filed on Sep. 15, 2021; which is herein incorporated by reference in its entirety.

FIELD

Example embodiments of the present disclosure generally relate to automated guided vehicles (AGVs), and more specifically, to the configuration of the AGVs.

BACKGROUND

The AGVs refer to portable robots that follow along marked long lines or wires on the floor, or use radio waves, vision cameras, magnets, or lasers for navigation. The AGVs are widely used in industrial applications to transport heavy materials around a large industrial building, such as a factory or warehouse.

The AGVs need to be configured before actual running. Traditionally, each of the AGVs needs to be configured individually. For example, controller programs and configuration files for each AGV need to be created at the respective AGV or imported to the respective AGV for configuring the AGV. Such configuration work is labor-intensive and consumes a lot of resources. Therefore, there is a need for a solution of configuring the AGVs in a more efficient way.

SUMMARY

In view of the foregoing problems, example embodiments of the present disclosure propose a solution for configuring a plurality of AGVs in an efficient way.

In a first aspect, example embodiments of the present disclosure provide a method for configuring a plurality of AGVs. The method comprises: creating, at a management system managing the plurality of AGVs, a plurality of folders corresponding to the plurality of AGVs, a folder comprising at least one configuration file for configuring an AGV; updating a further folder of the plurality of folders based on a configuration file in the folder; and transmitting one or more configuration files in the updated further folder to an AGV corresponding to the further folder.

In some embodiments, the updating comprises copying the configuration file from the folder to the further folder.

In some embodiments, the updating further comprises at least one of the following: modifying the copied configuration file: updating a version number of the copied configuration file in response to modifying the copied configuration file; and backing up the copied configuration file to a backup subfolder in the further folder.

In some embodiments, the at least one configuration file comprises at least one of the following: an alarm file, a log file, a map parameter file, a communication parameter file, a motion parameter file, a controller program file, and a simultaneous localization and mapping (SLAM) file.

In some embodiments, the folder is identified based on an IP address of the corresponding AGV.

In some embodiments, the configuration file comprises information indicating at least one of the following: an identifier of the folder, an IP address of the corresponding AGV, and a version number of the configuration file.

In some embodiments, the folder is accessible by the corresponding AGV via File Transfer Protocol (FTP).

In some embodiments, creating the plurality of folders comprises receiving a configuration file from an AGV.

In some embodiments, the method further comprises updating the folder by at least one of the following: modifying the configuration file: backing up the configuration file to a backup subfolder in the folder; and restoring the configuration file from a backup subfolder to the folder.

In a second aspect, example embodiments of the present disclosure provide an apparatus for managing a tool in a robot system. The apparatus comprises: an creating unit, configured for creating, at a management system managing the plurality of AGVs, a plurality of folders corresponding to the plurality of AGVs, a folder comprising at least one configuration file for configuring an AGV: an updating unit, configured for updating a further folder of the plurality of folders based on a configuration file in the folder; and a transmitting unit, configured for transmitting one or more configuration files in the updated further folder to an AGV corresponding to the further folder.

In some embodiments, the creating unit is further configured for receiving a configuration file from an AGV.

In some embodiments, the updating unit is further configured for copying the configuration file from the folder to the further folder.

In some embodiments, the updating unit is further configured for at least one of the following: modifying the copied configuration file: updating a version number of the copied configuration file in response to modifying the copied configuration file; and backing up the copied configuration file to a backup subfolder in the further folder.

In some embodiments, the updating unit is further configured for updating the folder by at least one of the following: modifying the configuration file: backing up the configuration file to a backup subfolder in the folder; and restoring the configuration file from a backup subfolder to the folder.

In some embodiments, the at least one configuration file comprises at least one of the following: an alarm file, a log file, a map parameter file, a communication parameter file, a motion parameter file, a controller program file, and a simultaneous localization and mapping (SLAM) file.

In some embodiments, the folder is identified based on an IP address of the corresponding AGV.

In some embodiments, the configuration file comprises information indicating at least one of the following: an identifier of the folder, an IP address of the corresponding AGV, and a version number of the configuration file.

In some embodiments, the folder is accessible by the corresponding AGV via File Transfer Protocol (FTP).

In a third aspect, example embodiments of the present disclosure provide a system for configuring a plurality of AGVs. The system comprises: a computer processor coupled to a computer-readable memory unit, the memory unit comprising instructions that when executed by the computer processor implements the method for configuring a plurality of AGVs.

In a fourth aspect, example embodiments of the present disclosure provide a computer readable medium having instructions stored thereon, the instructions, when executed on at least one processor, cause the at least one processor to perform the method for configuring a plurality of AGVs.

According to embodiments of the present disclosure, the configuration files for some AGVs may be easily created based on the configuration files for other AGVs. The configuration files of the plurality of AGVs may be managed in a centralized way. For example, the configuration files may be easily copied, modified, backed up, restored and deleted at the management system managing the plurality of AGVs. Moreover, the configuration files at the management system may be downloaded to the selected AGVs as required for the configuration of the selected AGVs. Thus, the configuration work for the plurality of AGVs may be performed in a centralized and efficient way.

DESCRIPTION OF DRAWINGS

Drawings described herein are provided to further explain the present disclosure and constitute a part of the present disclosure. The example embodiments of the disclosure and the explanation thereof are used to explain the present disclosure, rather than to limit the present disclosure improperly.

FIG. 2 illustrates a flowchart of a method for configuring a plurality of AGVs according to embodiments of the present disclosure;

Throughout the drawings, the same or similar reference symbols are used to indicate the same or similar elements.

DETAILED DESCRIPTION OF EMBODIMENTS

Figure 1:
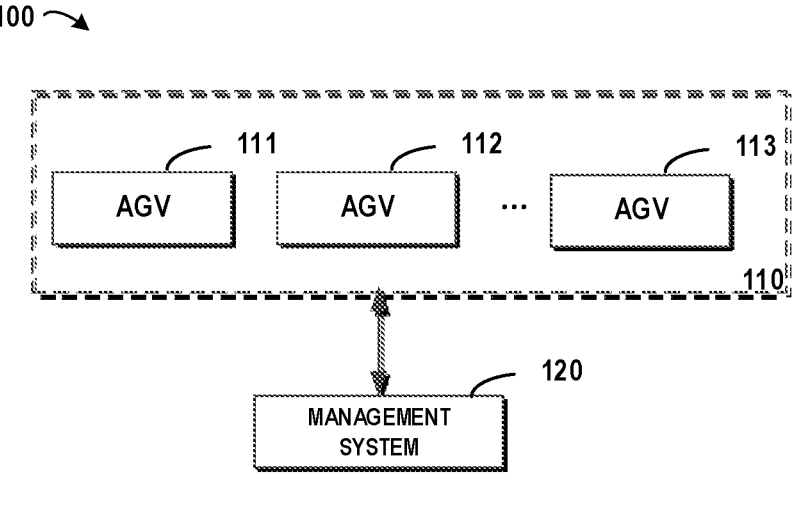
FIG. 1 illustrates an example environment for configuring a plurality of AGVs in accordance with an embodiment of the present disclosure.

Principles of the present disclosure will now be described with reference to several example embodiments shown in the drawings. Though example embodiments of the present disclosure are illustrated in the drawings, it is to be understood that the embodiments are described only to facilitate those skilled in the art in better understanding and thereby achieving the present disclosure, rather than to limit the scope of the disclosure in any manner.

The term "comprises" or "includes" and its variants are to be read as open terms that mean "includes, but is not limited to." The term "or" is to be read as "and/or" unless the context clearly indicates otherwise. The term "based on" is to be read as "based at least in part on." The term "being operable to" is to mean a function, an action, a motion or a state can be achieved by an operation induced by a user or an external mechanism. The term "one embodiment" and "an embodiment" are to be read as "at least one embodiment." The term "another embodiment" is to be read as "at least one other embodiment." The terms "first." "second," and the like may refer to different or same objects. Other definitions, explicit and implicit, may be included below. A definition of a term is consistent throughout the description unless the context clearly indicates otherwise.

As described above, it is expected to configure a plurality of AGVs in a more efficient way than configuring each of the plurality of AGVs individually. Currently, it is proposed to configure a plurality of AGVs by sending common configuration information to each of the plurality of AGVs. However, in this case, the AGVs may still need to be configured individually so as to run differently. For example, an operator may need to modify configuration parameters at each AGV and this would be very time-consuming and inefficient. Thus a solution of configuring a plurality of AGVs in an efficient and centralized way is highly in demand.

In order to at least partially solve the above and other potential problems, embodiments of the present disclosure provide a solution for configuring a plurality of AGVs. According to the solution, a plurality of folders corresponding to the plurality of AGVs are created at a management system managing the plurality of AGVs. Here a folder comprises at least one configuration file for configuring an AGV. Based on a configuration file in the folder, a further folder of the plurality of folders is updated. One or more configuration files in the updated further folder are transmitted to an AGV corresponding to the further folder for configuration of the AGV. Further, embodiments of present disclosure provide apparatuses, systems, and computer readable media for configuring a plurality of AGVs.

With these embodiments, configuration files for a plurality of AGVs can be easily created and managed at the management system and thus the plurality of AGVs can be configured in an efficient and centralized way.

Hereinafter, the principles of the present disclosure will be described in detail with reference to FIGS. 1-7. Referring to FIG. 1, an example environment 100 in which embodiments of the present disclosure can be implemented is shown. It is to be understood that the elements of the environment 100 are described only for the purpose of illustration without suggesting any limitations as to the scope of the present disclosure. The embodiments of the present disclosure can be embodied with different elements.

As shown in FIG. 1, the environment 100 includes a plurality of AGVs, for example, AGV 111, AGV 112 and AGV 113 (collectively referred to as AGVs 110). The plurality of AGVs 110 are managed by a management system 120.

The management system 120 may be any appropriate system for vehicle tracking, navigating, routing, maintenance, financing and replacement. An operator or manager may use the management system 120 to control the running of the plurality of AGVs 110. For example, the management system 120 may be a standard Fleet management system (FMS). Alternatively, the management system 120 may be a further system in communication with the FMS and both of the management system 120 and the FMS manage or control the running of the plurality of AGVs 110.

The management system 120 may be configured locally or remotely. As an example, the management system 120 may be configured at a computer or server which locates in a site employing the plurality of AGVs 110. As another example, the management system 120 may be configured at a computer or server away from the plurality of AGVs.

The plurality of AGVs 110 and the management system 120 may communicate in any appropriate ways. As an example, the management system 120 may be in communication with the plurality of AGVs over a wireless local area network. As another example, the management system 120 may be in wired connection with the plurality of AGVs. The scope of the present disclosure is not intended to be limited in this respect.

Reference will be made to FIG. 2 for details of the present disclosure. FIG. 2 illustrates a flowchart of a method 200 for configuring a plurality of AGVs in accordance with embodiments of the present disclosure. The method 200 may be implemented at the management system 120 as shown in FIG. 1. Alternatively, the method 200 may be implemented at any appropriate system in communication with the management system 120. It is to be understood that the method 200 may also comprise additional blocks (not shown) and/or may omit the illustrated blocks. The scope of the present disclosure described herein is not limited in this aspect.

Figure 3:
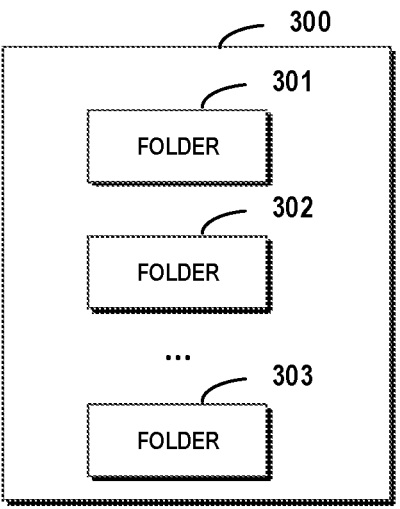
FIG. 3 illustrates a schematic diagram of a file system in accordance with an embodiment of the present disclosure.

At block 210, a plurality of folders corresponding to the plurality of AGVs 110 are created at the management system 120. A folder comprises at least one configuration file for configuring an AGV. In other words, a file system comprising a plurality of folders may be created at the management system 120 for configuring the plurality of AGVs 110. FIG. 3 illustrates a schematic diagram of a file system in accordance with an embodiment of the present disclosure.

As shown in FIG. 3, the file system comprises a plurality of folders, for example, folder 301, 302 and 303 (collectively referred to as 300). The folders 300 correspond to the plurality of AGVs 110. In other words, each of the plurality of folders comprises one or more configuration files for the respective AGV. For example, the folder 301 may correspond to the AGV 111 and comprise one or more configuration files for configuring the AGV 111. Similarly, the folder 302 may correspond to the AGV 112 and the folder 303 may correspond to the AGV 113.

In some embodiments, the folders 300 may be identified based on the properties of the corresponding AGVs. For example, the folders may be identified by the IP address of the corresponding AGVs. Additionally or alternatively, the folders 300 may be identified by the names or sequence numbers of the corresponding AGVs.

In some embodiments, the folders 300 may be created before or after the plurality of AGVs 110 are connected to the management system 120. As an example, a number of folders may be pre-created according to the number of AGVs to be connected to the management system 120. As another example, a folder may be created when or after the corresponding AGV is connected to the management system 120.

In some embodiments, when creating the folders 300, the folders 300 may comprise a number of predetermined configuration files. The predetermined configuration files may be obtained from historical configuration files. Alternatively or in addition, the predetermined configuration files may be obtained from the manual setting of the operator. Alternatively, a folder created at the first time may be empty.

In some embodiments, creating the folders 300 may comprise receiving a configuration file from the corresponding AGV. For example, the operator may perform the configuration work at the AGV 111 and thus generate one or more configuration files for the AGV 111. The one or more configuration files for the AGV 111 may be uploaded or transmitted to the corresponding folder 301 at the management system 120.

Alternatively or in addition, creating the folders 300 may comprise preparing the configuration files at the management system 120. As an example, the operator may create new configuration files at the management system 120. As another example, the operator may modify the received configuration files at the management system 120.

In some embodiments, the folders 300 are accessible by the corresponding AGVs via File Transfer Protocol (FTP). For example, the file system may be configured at a FTP server. In this case, the plurality of AGVs 110 and the management system 120 may communicate and transfer files on a Transmission Control Protocol/Internet Protocol (TCP/IP) network. Alternatively or in addition, the folders 300 may be accessible via other appropriate protocols.

In some embodiments, each of the folders 300 may be only accessibly by the corresponding AGV. For example, the access to the folder may need to be authenticated with the IP address of the AGV. Alternatively or in addition, the access to the folder may need to be authenticated with a username and a password.

Figure 4:
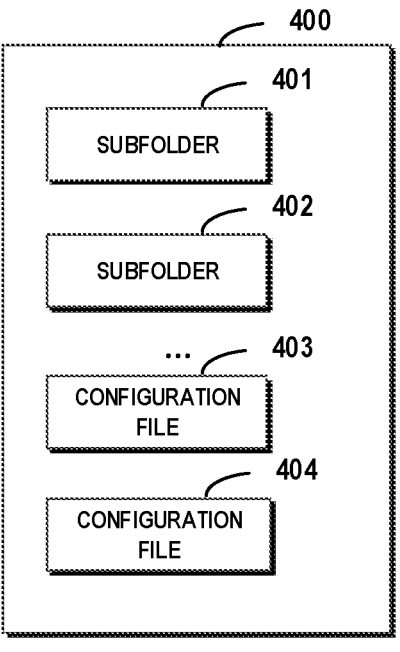
FIG. 4 illustrates a schematic diagram of a folder in accordance with an embodiment of the present disclosure.

FIG. 4 illustrates a schematic diagram of a folder 400 in accordance with an embodiment of the present disclosure. As shown in FIG. 4, the folder 400 may comprise a number of subfolders, for example, subfolder 401 and 402. The subfolders 401 and 402 may each comprise a number of configuration files. The folder 400 may further comprise a number of configuration files which are not organized in the subfolders, for example, configuration file 403 and 404.

In some embodiments, the configuration file may refer to any file appropriate for configuring the AGVs. Examples of the configuration files may comprise an alarm file, a log file, a map parameter file, a communication parameter file, a motion parameter file, a controller program file, and a simultaneous localization and mapping (SLAM) file, etc. The configuration files for configuring the AGVs may be of any appropriate forms. For example, the configuration file may be a document file, a spreadsheet file, a database file, etc. The scope of the present disclosure described herein is not limited in this aspect.

Figure 5:
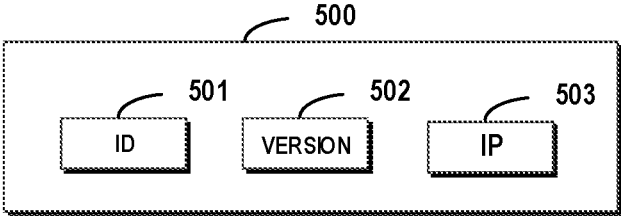
FIG. 5 illustrates a schematic diagram of a configuration file in accordance with an embodiment of the present disclosure.

FIG. 5 illustrates a schematic diagram of a configuration file 500 in accordance with an embodiment of the present disclosure. The configuration file 500 may comprise a plurality of fields. The plurality of fields may indicate properties of the configuration file 500. As shown in FIG. 5, the configuration file 500 may comprise a field 501 indicating an identifier of the folder to which the configuration file 500 belongs. For example, the field 501 may indicate the name of the folder containing the configuration file 500. Alternatively or in addition, the configuration file 500 may comprise a field 502 indicating a version number of the configuration file 500 and a field 503 indicating the IP address of the corresponding AGV. The configuration file 500 may further comprise a field indicating an identifier of the configuration file 500 (not shown). These fields of the configuration file 500 may be useful for tracking and versioning control of the configuration files.

Referring back to FIG. 2, at block 220, a further folder of the plurality of folders is updated based on a configuration file in the folder. In other words, at the management system 120, one or more folders may be updated based on a folder of the plurality of folders 300.

In some embodiments, updating the folder may comprise copying a configuration file from a first folder to one or more further folders. For example, the operator may copy a configuration file from the folder 301 to the folder 302. Additionally, in response to the copy operation, the fields of the copied configuration file may be adapted to the new folder. For example, the field 501 of the copied configuration file may be adapted to indicating the identifier of the folder 302 instead of the identifier of the original folder 301.

Additionally, updating the folder may comprise modifying the configuration file. Additionally, the operator may further update the version number of the configuration file in response to modifying the configuration file. For example, the version number of the configuration file may be incremented in response to each modification. In this way, the change of configuration files may be tracked easily.

Alternatively or in addition, updating the folder may comprise backing up the configuration file to a backup subfolder in the folder. The configuration files may be backed up or restored as required. For example, the operator may backup the configuration file to a backup subfolder of the folder 302. In this case, the folder 302 may comprise a current configuration file and the backup subfolder of the folder 302 may comprise a backup of the configuration file.

It is to be noted that, the updating operation may be performed for the originally created folders and the updated folders. For example, the copied configuration file in the folder 302 may also be modified, backed up or restored as required.

Referring back to FIG. 2, at block 230, one or more configuration files in the updated further folder are transmitted to an AGV corresponding to the further folder. In other words, at the management system 120, one or more configuration files in the updated folder(s) may be transmitted to the corresponding AGV(s) for configuring the corresponding AGV(s).

In some embodiments, one or more selected configuration files may be transmitted or downloaded to the corresponding AGV(s). For example, the operator may only select the modified configuration files to transmit to the corresponding AGV(s) to update the configuration of the corresponding AGV(s).

Alternatively, all configuration files of the updated folder may be transmitted to the corresponding AGV. For example, all of the configuration files may be downloaded to the corresponding AGV to configure the AGV at a first time.

It is to be noted that, the operations indicated at block 220 and 230 may be integrated as one operation. For example, the operator may select a configuration file in the folder 301 and simply clicks a button to transmit the configuration file to the AGV 112 corresponding to the folder 302. In this case, the operator does not need to explicitly perform an operation of copying the configuration file from the folder 301 to the folder 302 while the configuration file is copied from the folder 301 to the folder 302 and also transmitted to the AGV 112.

With these embodiments, the configuration files for a plurality of AGVs may be easily created based on the configuration files for certain AGVs. The configuration files for the plurality of AGVs may be managed at the management system 120 in a centralized way. For example, the configuration files may be easily copied, modified, backed up, restored and deleted at the management system 120. Moreover, the configuration files in the folders at the management system 120 may be downloaded to the selected AGV(s). Thus, the configuration of the plurality of AGVs 110 may be performed in a centralized and efficient way.

Figure 6:
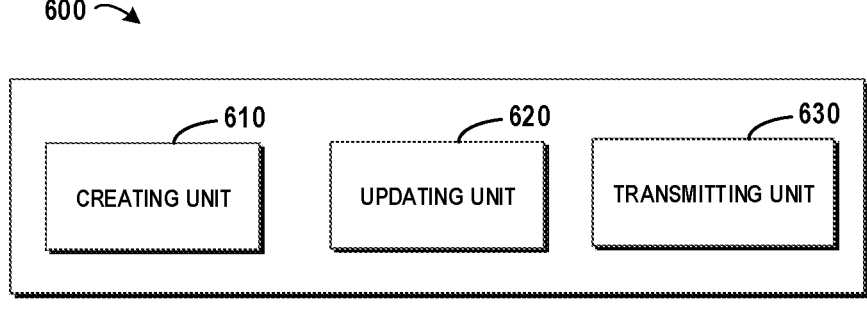
FIG. 6 illustrates a schematic diagram of an apparatus for configuring a plurality of AGVs in accordance with embodiments of the present disclosure.

The preceding paragraphs have provided detailed steps of the method 200, in other embodiments of the present disclosure, the method 200 may be implemented by an apparatus. FIG. 6 illustrates a schematic diagram of an apparatus 600 for managing a plurality of AGVs in accordance with embodiments of the present disclosure. Here, the apparatus 600 comprises: an creating unit 610, configured for creating, at a management system managing the plurality of AGVs, a plurality of folders corresponding to the plurality of AGVs, a folder comprising at least one configuration file for configuring an AGV: an updating unit 620, configured for updating a further folder of the plurality of folders based on a configuration file in the folder; and a transmitting unit 630, configured for transmitting one or more configuration files in the updated further folder to an AGV corresponding to the further folder.

In some embodiments of the present disclosure, the creating unit 610 is further configured for receiving a configuration file from an AGV.

In some embodiments of the present disclosure, the updating unit 620 is further configured for copying the configuration file from the folder to the further folder.

In some embodiments of the present disclosure, the updating unit 620 is further configured for at least one of the following: modifying the copied configuration file: updating a version number of the copied configuration file in response to modifying the copied configuration file; and backing up the copied configuration file to a backup subfolder in the further folder.

In some embodiments of the present disclosure, the updating unit 620 is further configured for updating the folder by at least one of the following: modifying the configuration file: backing up the configuration file to a backup subfolder in the folder; and restoring the configuration file from a backup subfolder to the folder.

In some embodiments of the present disclosure, the at least one configuration file comprises at least one of the following: an alarm file, a log file, a map parameter file, a communication parameter file, a motion parameter file, a controller program file, and a simultaneous localization and mapping (SLAM) file.

In some embodiments of the present disclosure, the folder is identified based on an IP address of the corresponding AGV.

In some embodiments of the present disclosure, the configuration file comprises information indicating at least one of the following: an identifier of the folder, an IP address of the corresponding AGV, and a version number of the configuration file.

In some embodiments of the present disclosure, the folder is accessible by the corresponding AGV via File Transfer Protocol (FTP).

Figure 7:
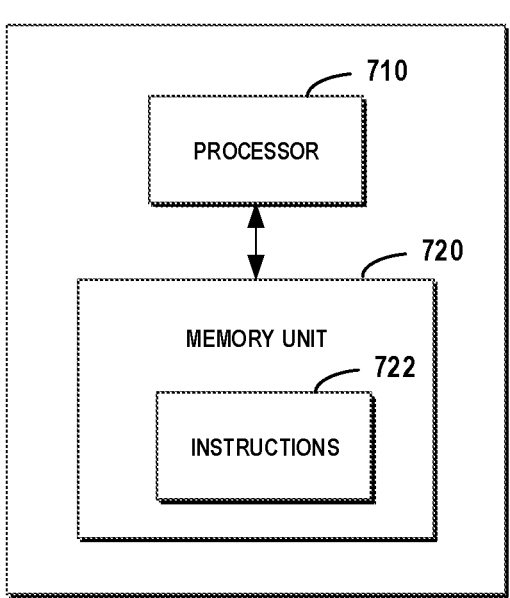
FIG. 7 illustrates a schematic diagram of a system for configuring a plurality of AGVs in accordance with embodiments of the present disclosure.

In some embodiments of the present disclosure, a system 700 is provided for managing a tool in a robot system. FIG. 7 illustrates a schematic diagram of the system 700 for configuring a plurality of AGVs in accordance with embodiments of the present disclosure. As illustrated in FIG. 7, the system 700 may comprise a computer processor 710 coupled to a computer-readable memory unit 720, and the memory unit 720 comprises instructions 722. When executed by the computer processor 710, the instructions 722 may implement the method 200 for configuring a plurality of AGVs as described in the preceding paragraphs, and details will be omitted hereinafter.

In some embodiments of the present disclosure, a computer readable medium for tuning a robot system is provided. The computer readable medium has instructions stored thereon, and the instructions, when executed on at least one processor, may cause at least one processor to perform the method for configuring a plurality of AGVs as described in the preceding paragraphs, and details will be omitted hereinafter.

In some embodiments of the present disclosure, a computer program product is provided for configuring a plurality of AGVs. The computer readable medium has instructions stored thereon, and the instructions, when executed on at least one processor, may cause at least one processor to perform the method for configuring a plurality of AGVs as described in the preceding paragraphs, and details will be omitted hereinafter.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to FIG. 2. Generally, program modules include routines, programs, libraries, objects, classes, components, data structures, or the like that perform particular tasks or implement particular abstract data types. The functionality of the program modules may be combined or split between program modules as ideal in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. On the other hand, various features that are described in the context of a single embodiment may also be implemented in multiple embodiments separately or in any suitable subcombination.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for configuring a plurality of automated guided vehicles (AGVs), comprising:

creating, at a management system managing the plurality of AGVs, a plurality of folders corresponding to the plurality of AGVs, a first folder of the plurality of folders comprising at least one configuration file for configuring an AGV;

updating a further folder of the plurality of folders based on a configuration file of the at least one configuration file of the first folder thereby creating an updated further folder of the plurality of folders;

authenticating access to each folder of the plurality of folders for each corresponding AGV of the plurality of AGVs, wherein the access is authenticated by an internet protocol (IP) address corresponding to each of the plurality of AGVs; and transmitting one or more configuration files in the updated further folder to an AGV corresponding to the further folder.

2. The method of claim 1, wherein the updating comprises copying the configuration file from the folder to the further folder.

3. The method of claim 2, wherein copying the configuration file from the folder to the further folder creates a copied configuration file in the further folder, and wherein the updating further comprises at least one of the following:

modifying the copied configuration file;

updating a version number of the copied configuration file in response to modifying the copied configuration file; and backing up the copied configuration file to a backup subfolder in the further folder.

4. The method of claim 1, wherein the at least one configuration file comprises at least one of the following:

an alarm file, a log file, a map parameter file, a communication parameter file, a motion parameter file, a controller program file, and a simultaneous localization and mapping (SLAM) file.

5. The method of claim 1, wherein the folder is identified based on an IP address of the corresponding AGV.

6. The method of claim 1, wherein the configuration file comprises information indicating at least one of the following:

an identifier of the folder, an IP address of the corresponding AGV, and a version number of the configuration file.

7. The method of claim 1, wherein the folder is accessible by the corresponding AGV via File Transfer Protocol (FTP).

8. The method of claim 1, wherein creating the plurality of folders comprises receiving a configuration file from an AGV.

9. The method of claim 1, further comprising updating the folder by at least one of the following:

modifying the configuration file;

backing up the configuration file to a backup subfolder in the folder; and restoring the configuration file from a backup subfolder to the folder.

10. The method of claim 1, further comprising:

connecting a new AGV of the plurality of AGVs to the management system; and automatically creating, by the management system, a new folder of the plurality of folders corresponding to the new AGV of the plurality of AGVs after connecting the new AGV of the plurality of AGVs to the management system.

11. A system for configuring a plurality of automated guided vehicles (AGVs), comprising: a computer processor coupled to a non-transitory computer-readable memory unit, the memory unit containing instructions that when executed by the computer processor implements the method according to claim 1.

12. A non-transitory computer readable medium having instructions stored thereon, the instructions, when executed on at least one processor, cause the at least one processor to perform the method according to claim 1.

\* \* \* \* \*